United States Patent
Akuzuwa et al.

(10) Patent No.: US 8,630,201 B2
(45) Date of Patent: Jan. 14, 2014

(54) CALL CONTROL SYSTEM, CALL CONTROLLER, TERMINAL DEVICE, AND CALL CONTROL METHOD

(75) Inventors: Mari Akuzuwa, Yokohama (JP); Shigeru Iwashina, Yokohama (JP)

(73) Assignee: NTT DoCoMo, Inc., Chiyoda-ku, Tokyo (JP)

(*) Notice: Subject to any disclaimer, the term of this patent is extended or adjusted under 35 U.S.C. 154(b) by 283 days.

(21) Appl. No.: 13/142,245

(22) PCT Filed: Dec. 18, 2009

(86) PCT No.: PCT/JP2009/007004
§ 371 (c)(1), (2), (4) Date: Jun. 24, 2011

(87) PCT Pub. No.: WO2010/073567
PCT Pub. Date: Jul. 1, 2010

(65) Prior Publication Data
US 2011/0261717 A1 Oct. 27, 2011

(30) Foreign Application Priority Data
Dec. 25, 2008 (JP) ................. 2008-329188

(51) Int. Cl.
*H04L 12/12* (2006.01)
*H04W 4/00* (2009.01)

(52) U.S. Cl.
USPC ............................ 370/252; 370/338; 370/339

(58) Field of Classification Search
USPC ............................ 370/252, 338, 389; 455/426
See application file for complete search history.

(56) References Cited

U.S. PATENT DOCUMENTS

2005/0036486 A1* 2/2005 Sahinoglu et al. ............ 370/389
2005/0227692 A1 10/2005 Kawashima et al.
2005/0249171 A1* 11/2005 Buckley et al. ............... 370/338

FOREIGN PATENT DOCUMENTS

| EP | 1 686 820 A1 | 8/2006 |
|---|---|---|
| JP | 2005-277815 A | 10/2005 |
| JP | 2008-529365 A | 7/2006 |

(Continued)

OTHER PUBLICATIONS

PCT/JP2009/007004 PCT/IB/338, 1 page.
PCT/JP2009/007004 PCT/IB/373, 1 page.

(Continued)

*Primary Examiner* — Abdullah Riyami
*Assistant Examiner* — Brian Cox
(74) *Attorney, Agent, or Firm* — Crowell & Moring LLP

(57) ABSTRACT

There is provided a call control system, a call controller, a terminal device, and a call control method of this type, whereby a communication network to be used by a terminal device on the receiving side is determined in an efficient manner to allow communication promptly, in a communication where plural communication networks are selectively used. On receipt of a reception request from the terminal device 220 on the receiving side, call control signals are concurrently transmitted, each having a call identifier for identifying a call to the plurality of communication networks, respectively, estimated to be available to the terminal device on the receiving side, based upon the available network data held by the holding, and upon receipt of each of call responses to the call control signals concurrently transmitted, from each of the plurality of communication networks, a communication network to be used by the terminal device on the receiving side is determined based upon call control condition information representing a condition relating to the call control and communication resource information included in a single call response received in a relatively early order.

10 Claims, 14 Drawing Sheets

(56) References Cited

FOREIGN PATENT DOCUMENTS

| JP | 2008-028636 A | 2/2008 |
| JP | 2008-028654 A | 2/2008 |
| JP | 2008-072313 A | 3/2008 |

OTHER PUBLICATIONS

PCT/JP2009/007004 PCT/ISA/237 (Translation), 4 pages.
Chinese Office Action dated May 6, 2013 with English translation (Twenty Three (23) pages).

* cited by examiner

FIG. 3
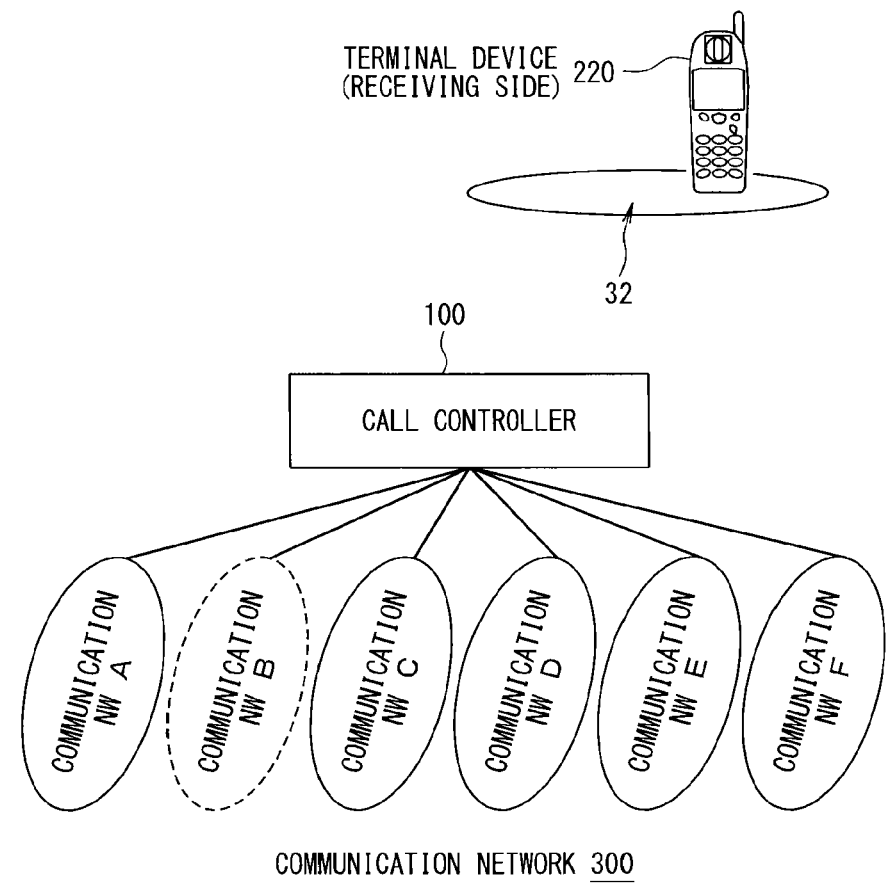
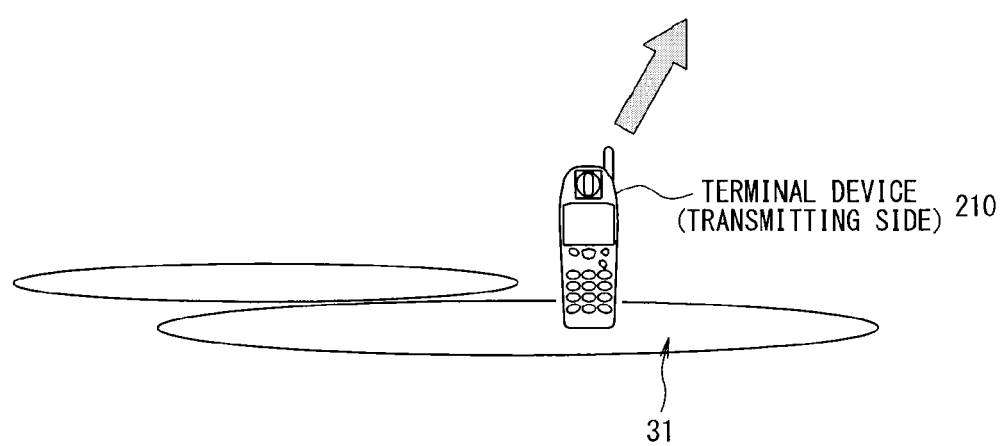

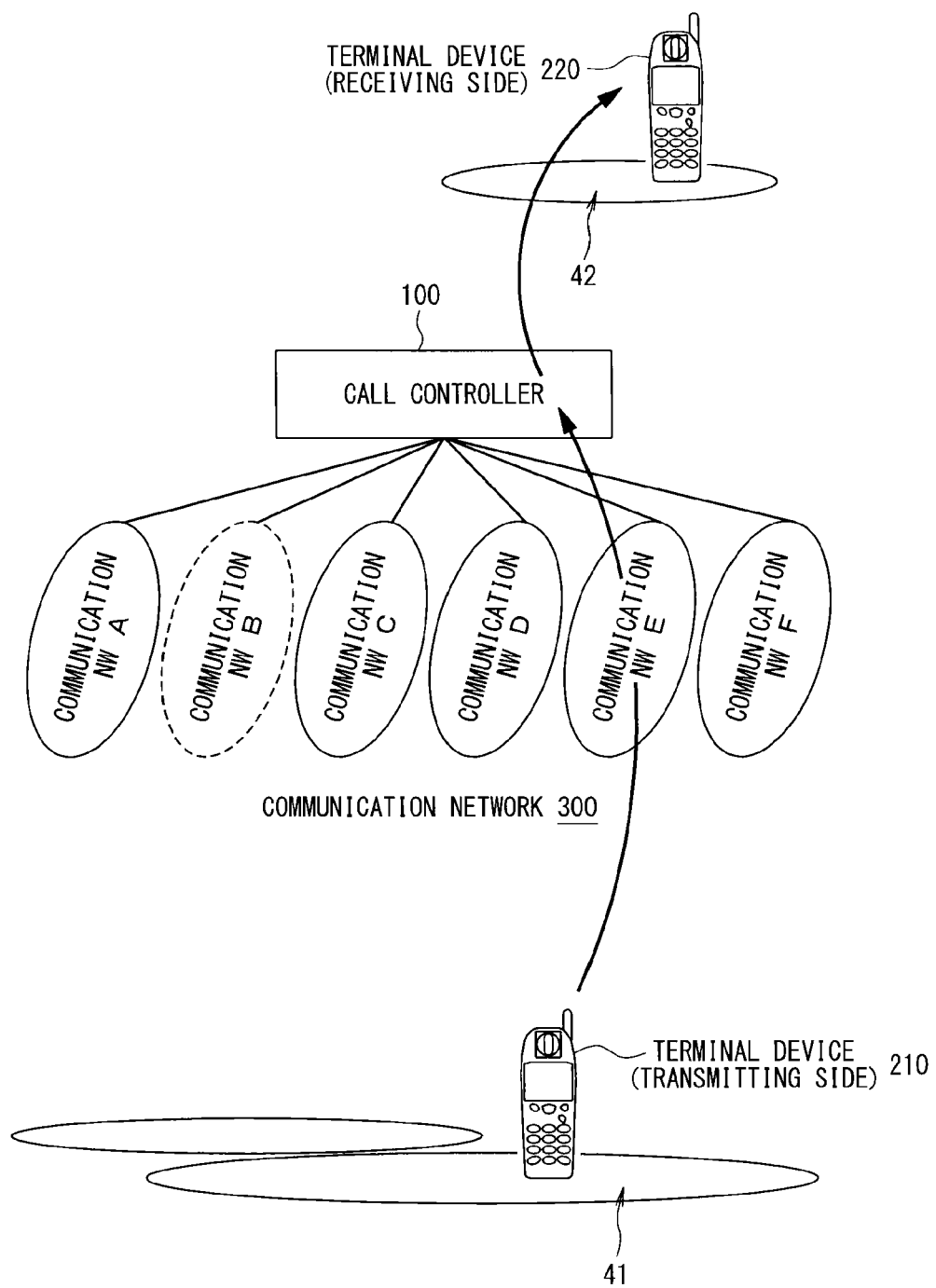
F I G. 4

F I G. 6

| TYPE OF CALL | VOICE | E-MAIL |
|---|---|---|
| PRIORITY ORDER IN SELECTION OF COMMUNICATION NETWORK | (E) | A |
| | C | C |
| | D | D |

FIG. 9
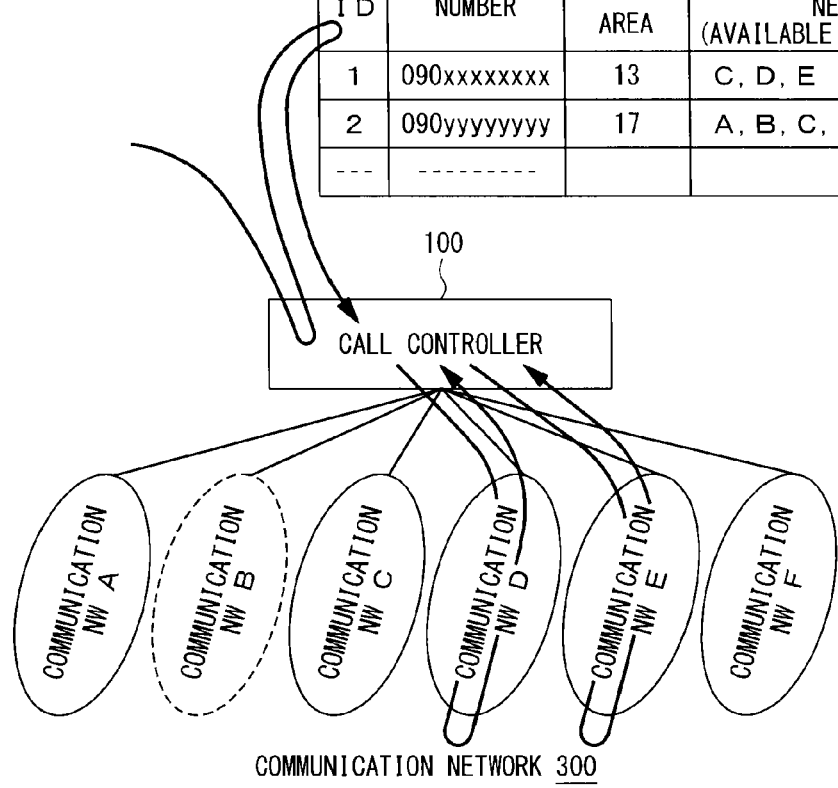
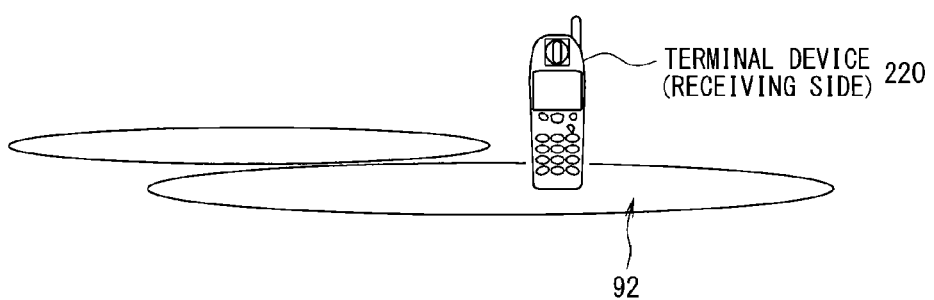

CALL CONTROL SYSTEM, CALL CONTROLLER, TERMINAL DEVICE, AND CALL CONTROL METHOD

TECHNICAL FIELD

The present invention relates to a call control system, a call controller, a terminal device, and a call control method, and in particular to, a call control system, a call controller, a terminal device, and a call control method, whereby a communication network to be used by a terminal device on a receiving side is determined in an efficient manner to allow communication promptly under the environment where plural communication networks are selectively available to each of the terminal devices and the call controllers.

BACKGROUND ART

In recent years, mobile communication systems or IP telephone systems, for example, in which plural communication networks are selectively used for communication, are realized.

In such communication systems, a call controller determines a communication network adaptable to a communication at a terminal device on the receiving side. In this determination, however, it is difficult to determine the communication network depending on information already held by the call controller.

This is because it is difficult to always monitor all conditions of the communication networks relating to the terminal device on the receiving side.

For this reason, a reception process is sequentially tried through plural communication networks estimated to be available, based upon the information on the conditions of the communication networks regularly updated. As a result, generally, a communication network to which the terminal device on the receiving side has made a normal response is determined to be a network for use in call setting.

Accordingly, as the number of the communication networks available to the terminal device on the receiving side is increased, there is a tendency of increasing the average period of time for determining the communication network to be used for the call setting.

On the other hand, there is a proposed technique of selecting the communication network by the user's determination or automatic determination made by a server, in selectively applying plural communication networks for a call connection between the terminal device on the transmitting side and the terminal device on the receiving side (for example, see Patent Document 1).

PRIOR ART DOCUMENTS

Patent Documents

Patent Document 1: JP 2005-277815 A (Abstract, Claim 1, Paragraph 0005 to Paragraph 0006, and the like)

SUMMARY OF THE INVENTION

Problem to be Solved by the Invention

As described above, in a communication system in which plural communication networks can be selectively used for call setting, the reception process is sequentially tried through plural communication networks conventionally in determining the communication network to be adaptable to the call setting for this determination depending on the trial result.

Thus, there is a technical problem in that as the number of the available communication networks is increased, the period of time for establishing the call setting and enabling the communication is delayed. In contrast, the technique of the above-described Patent Document 1 is not capable of addressing such a technical problem.

The present invention has been made in view of the above circumstance, and has an object to provide a call control system, a call controller, a terminal device, and a call control method, whereby a communication network to be used by a terminal device on the receiving side is determined in an efficient manner to allow communication promptly, in a communication where plural communication networks are selectively used.

Solution to the Problem

To solve the above problem, according to the present invention, systems and devices to be listed below are proposed.

According to an aspect of the present invention, there is provided a call control system comprising a call controller for performing a call control by selectively using a plurality of communication networks and a plurality of terminal devices, the call controller comprising:

a receiving-side terminal device current state monitoring unit for acquiring from a terminal device on a receiving side available network data representing a communication network available to the terminal device on the receiving side;

an available network data holding unit for holding the available network data acquired by the receiving-side terminal device current state monitoring unit; and a call control unit for, upon receipt of a reception request from the terminal device on the receiving side, concurrently transmitting call control signals each having a call identifier for identifying a call to the plurality of communication networks, respectively, estimated to be available to the terminal device on the receiving side, based upon the available network data held by the available network data holding unit, and for, upon receipt of each of call responses to the call control signals concurrently transmitted, from each of the plurality of communication networks, determining a communication network to be used by the terminal device on the receiving side based upon call control condition information representing a condition relating to the call control and communication resource information included in a single call response received in a relatively early order, each of the plurality of terminal devices comprising:

a communication unit for communicating with the exterior; and a terminal-side call control unit for, when the communication unit receives the call control signals concurrently transmitted through the plurality of communication networks, respectively, estimated by the call controller to be available to the terminal device on the receiving side, returning a call response including the communication resource information together with the identifier through each of the plurality of communication networks to the call controller.

The above-described call control system is configured to include a call controller for performing a call control by selectively using a plurality of communication networks and a plurality of terminal devices.

In this call controller, the receiving-side terminal device current state monitoring unit acquires from the terminal device on the receiving side available network data representing a communication network available to the terminal device on the receiving side.

In addition, the available network data holding unit holds the available network data acquired by the receiving-side terminal device current state monitoring unit.

The call control unit, upon receipt of a reception request from the terminal device on the receiving side, concurrently transmits call control signals each having a call identifier for identifying a call to the plurality of communication networks, respectively, estimated to be available to the terminal device on the receiving side, based upon the available network data held by the available network data holding unit, and upon receipt of each of call responses to the call control signals concurrently transmitted, from each of the plurality of communication networks, determines a communication network to be used by the terminal device on the receiving side based upon call control condition information representing a condition relating to the call control and communication resource information included in a single call response received in a relatively early order.

Instead of sequentially searching one by one for a network to be used, the communication network to be adaptable is determined based upon responses to call control signals having identical call identifiers, respectively, that have been transmitted concurrently through plural communication networks. This enables a communication to be established promptly.

The above-described call control unit may determine a communication network to be used by the terminal device on the receiving side by use of information, as the call control condition information, including at least any of a congestion state of the communication network, a failure state of the communication network, and service information with which a terminal device on a transmitting side is connected.

In the above configuration, the communication network to be used by the terminal device on the receiving side is determined by use of information, as the call control condition information, including at least any of a congestion state of the communication network, a failure state of the communication network, and service information with which a terminal device on a transmitting side is connected.

The above-described call control unit may determine a communication network to be used by the terminal device on the receiving side by use of information, as communication resource information included in the call response, including at least any of data representing a communication network available in an area where the terminal device is currently located and data representing a communication network with which the terminal device is capable communicating.

In the above configuration, the communication network to be used by the terminal device on the receiving side is determined by use of information, as communication resource information included in the call response, including at least any of data representing a communication network available in an area where the terminal device is currently located and data representing a communication network with which the terminal device is capable communicating.

The above-described call control unit may determine a communication network to be used by the terminal device on the receiving side by applying communication resource information, included in the call response received in the earliest order, as communication resource information included in the call response received in a relatively early order.

In the above configuration, the communication network to be used by the terminal device on the receiving side is determined by applying communication resource information included in the call response received in the earliest order, as communication resource information included in the call response received in a relatively early order. This makes it possible to determine the communication network to be used more promptly.

According to another aspect of the present invention, there is provided a call controller, for performing a call control by selectively using a plurality of communication networks, to be adaptable to a call control system comprising the call controller and a plurality of terminal devices, the call controller comprising:

a receiving-side terminal device current state monitoring unit for acquiring from a terminal device on a receiving side available network data representing a communication network available to the terminal device on the receiving side;

an available network data holding unit for holding the available network data acquired by the receiving-side terminal device current state monitoring unit; and a call control unit for, upon receipt of a reception request from the terminal device on the receiving side, concurrently transmitting call control signals each having a call identifier for identifying a call to the plurality of communication networks, respectively, estimated to be available to the terminal device on the receiving side, based upon the available network data held by the available network data holding unit, and for, upon receipt of each of call responses to the call control signals concurrently transmitted, from each of the plurality of communication networks, determining a communication network to be used by the terminal device on the receiving side based upon call control condition information representing a condition relating to the call control and communication resource information included in a single call response received in a relatively early order.

The above-described call controller is adaptable to a call control system including the call controller and a plurality of terminal devices, and the call controller performs a call control by selectively using a plurality of communication networks. The call controller is a component of such a call control system.

In the above call controller, the receiving-side terminal device current state monitoring unit acquires from the terminal device on the receiving side available network data representing a communication network available to the terminal device on the receiving side.

The available network data holding unit holds the available network data acquired by the receiving-side terminal device current state monitoring unit.

The call control unit, upon receipt of a reception request from the terminal device on the receiving side, concurrently transmits call control signals each having a call identifier for identifying a call to the plurality of communication networks, respectively, estimated to be available to the terminal device on the receiving side, based upon the available network data held by the available network data holding unit, and upon receipt of each of call responses to the call control signals concurrently transmitted, from each of the plurality of communication networks, determines a communication network to be used by the terminal device on the receiving side based upon call control condition information representing a condition relating to the call control and communication resource information included in a single call response received in a relatively early order.

Instead of sequentially searching one by one for a network to be used, the communication network to be adaptable is determined based upon responses to call control signals having identical call identifiers, respectively, that have been transmitted concurrently through plural communication networks. This enables a communication to be established promptly.

The above-described call control unit may determine a communication network to be used by the terminal device on the receiving side by use of information, as the call control condition information, including at least any of a congestion state of the communication network, a failure state of the communication network, and service information with which a terminal device on a transmitting side is connected.

In the above-described call controller, the communication network to be used by the terminal device on the receiving side is determined by use of information, as the call control condition information, including at least any of a congestion state of the communication network, a failure state of the communication network, and service information with which a terminal device on a transmitting side is connected.

The above-described call control unit may determine a communication network to be used by the terminal device on the receiving side by use of information, as communication resource information included in the call response, including at least any of data representing a communication network available in an area where the terminal device is currently located and data representing a communication network with which the terminal device is capable communicating.

In the above-described call controller, the communication network to be used by the terminal device on the receiving side is determined by use of information, as communication resource information included in the call response, including at least any of data representing a communication network available in an area where the terminal device is currently located and data representing a communication network with which the terminal device is capable communicating.

The above-described call control unit may determine a communication network to be used by the terminal device on the receiving side by applying communication resource information, included in the call response received in the earliest order, as communication resource information included in a single call response received in a relatively early order.

In the above-described call controller, the communication network to be used by the terminal device on the receiving side is determined by applying communication resource information included in the call response received in the earliest order, as communication resource information included in the call response received in a relatively early order. This makes it possible to determine the communication network to be used more promptly.

According to yet another aspect of the present invention there is provided a terminal device to be adaptable to a call control system comprising a plurality of the terminal devices and a call controller for performing a call control by selectively using a plurality of communication networks, the terminal device comprising:

a communication unit for communicating with the exterior; and a terminal-side call control unit for, when the communication unit receives call control signals concurrently transmitted through the plurality of communication networks, respectively, estimated by the call controller to be available to the terminal device on a receiving side, returning a call response including communication resource information together with a prescribed identifier through each of the plurality of communication networks to the call controller.

The above-described terminal device is adaptable to a call control system comprising a plurality of the terminal devices and a call controller for performing a call control by selectively using a plurality of communication networks. The terminal device is a component of such a call control system.

The communication unit communicates with the exterior.

On the other hand, the terminal-side call control unit for, when the communication unit receives call control signals concurrently transmitted through the plurality of communication networks, respectively, estimated by the call controller to be available to the terminal device on a receiving side, returning a call response including communication resource information together with a prescribed identifier through each of the plurality of communication networks to the call controller.

The call responses each having a prescribed identical identifier are returned to the plurality of communication networks, respectively, to the call controller, whereby the communication network to be adaptable to the communication can be determined based upon the arrival order of the call responses that have been returned.

In the above-described terminal device, the terminal-side call control unit may return a call response including information together with a prescribed identifier, the information including at least any of data representing a communication network available in an area where the terminal device is currently located and data representing a communication network with which the terminal device is capable communicating, through each of the plurality of communication networks to the call controller.

In the above-described terminal device, the terminal-side call control unit returns a call response including information together with a prescribed identifier, the information including at least any of data representing a communication network available in an area where the terminal device is currently located and data representing a communication network with which the terminal device is capable communicating, through each of the plurality of communication networks to the call controller.

According to further another aspect of the present invention, there is provided a call control method in a call control system comprising a call controller for performing a call control by selectively using a plurality of communication networks and a plurality of terminal devices, the call control method comprising:

in the call controller, acquiring from a terminal device on a receiving side available network data representing a communication network available to the terminal device on the receiving side;

holding the available network data acquired by the monitoring; and

Upon receipt of a reception request from the terminal device on the receiving side, concurrently transmitting call control signals each having a call identifier for identifying a call to the plurality of communication networks, respectively, estimated to be available to the terminal device on the receiving side, based upon the available network data held by the holding, and upon receipt of each of call responses to the call control signals concurrently transmitted, from each of the plurality of communication networks, determining a communication network to be used by the terminal device on the receiving side based upon call control condition information representing a condition relating to the call control and communication resource information included in a single call response received in a relatively early order, in each of the plurality of terminal devices, communicating with the exterior; and when the communicating receives the call control signals concurrently transmitted through the plurality of communication networks, respectively, estimated by the call controller to be available to the terminal device on the receiving side, returning a call response including the communication resource information together with the identifier through each of the plurality of communication networks to the call controller.

In the above-described call control method, in the call controller, in the monitoring, available network data representing a communication network available to the terminal device on the receiving side is acquired from the terminal device on the receiving side.

In the holding, the available network data acquired by the monitoring.

Furthermore, upon receipt of a reception request from the terminal device on the receiving side, call control signals are concurrently transmitted, each having a call identifier for identifying a call to the plurality of communication networks, respectively, estimated to be available to the terminal device on the receiving side, based upon the available network data held by the holding, and upon receipt of each of call responses to the call control signals concurrently transmitted, from each of the plurality of communication networks, a communication network to be used by the terminal device on the receiving side is determined based upon call control condition information representing a condition relating to the call control and communication resource information included in a single call response received in a relatively early order Instead of sequentially searching one by one for a network to be used, the communication network to be adaptable is determined based upon responses to call control signals having identical call identifiers, respectively, that have been transmitted concurrently through plural communication networks. This enables a communication to be established promptly.

Advantageous Effects of the Invention

According to the present invention, a call control system, a call controller, a terminal device, and a call control method of this type are achieved, whereby a communication network to be used by a terminal device on the receiving side is determined in an efficient manner to allow communication promptly, in a communication where plural communication networks are selectively used.

BRIEF DESCRIPTION OF THE DRAWINGS

FIG. 3 is a conceptual diagram illustrative of a configuration example of a call control system including parts relating to the present invention;

FIG. 4 is a conceptual diagram illustrative of partial effects in the call control system of FIG. 3;

FIG. 6 is a diagram illustrative of a data structure held by the terminal device of FIG. 2;

FIG. 9 is a conceptual diagram illustrative of effects of parts relating to embodiments of the present invention in the call control system of FIG. 3;

DESCRIPTION OF EMBODIMENTS

Hereinafter, embodiments of the present invention will be described in detail with reference to the accompanied drawings to demonstrate the present invention. Specifically, in each of the drawings to be referred to, the substantial parts to be main subjects for description are described in detail as necessary for convenience, whereas the parts other than the substantial ones are simplified or omitted as necessary.
(Configuration Example of Call Controller)

Figure 1:
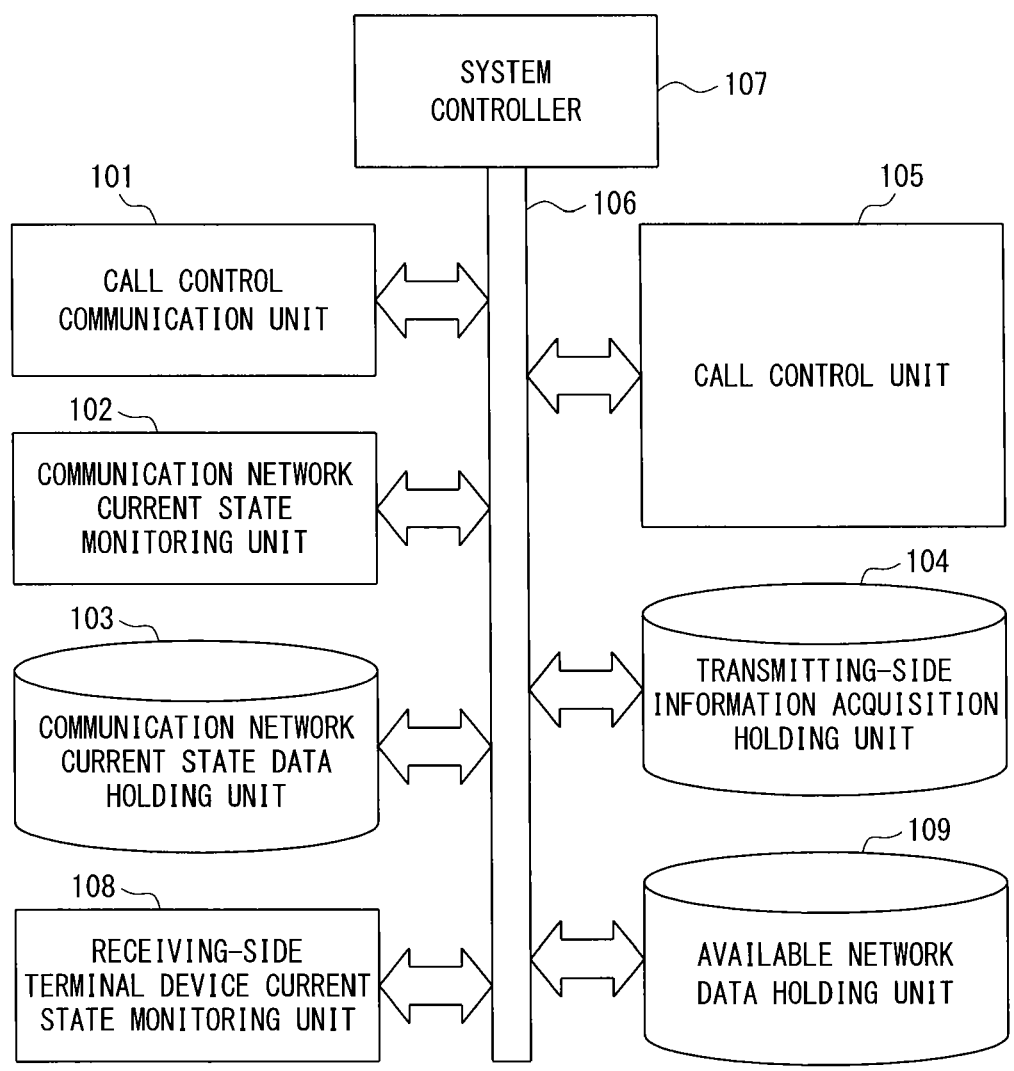
FIG. 1 is a functional block diagram illustrative of a call controller according to an embodiment of the present invention.

FIG. 1 is a functional block diagram illustrative of a call controller according to an embodiment of the present invention.

In this call controller 100, a call control communication unit 101, a communication network current state monitoring unit 102, a communication network current state data holding unit 103, a transmitting-side information acquisition holding unit 104, and a call control unit 105 are connected to a system controller 107 via a bus 106.

Additionally, to the system controller 107, a receiving-side terminal device current state monitoring unit 108 and an available network data holding unit 109 are connected via the bus 106.

The system controller 107 integrally manages each of the above-described units so that each of the units fulfills its function. This enables the call controller 100, as an integral part of the respective functions, fully fulfills the function thereof.

Each of the functional parts functions as follows in cooperation with the system controller 107.

The call control communication unit 101 performs various types of communication with the exterior, and acquires data for the corresponding functional part via the bus 106 and the system controller 107, and transmits the data generated by the corresponding functional part to the exterior.

The communication network current state monitoring unit 102 monitors the current states of plural communication networks, and acquires communication network current state data representing the current state of the communication network that has been monitored via the call control communication unit 101.

The communication network current state data holding unit 103 collects the communication network current data acquired by the communication network current state monitoring unit 102, and holds the data in a memory medium.

The transmitting-side information acquisition holding unit 104 receives a transmission request from the terminal device on the transmitting side, acquires and holds adaptable network data, representing a communication network adaptable to call setting in a coverage area where the terminal device on the transmitting side is located, included in the received transmission request.

The transmitting-side information acquisition holding unit 104 further acquires and holds available network data representing communication networks available to the above terminal device in the same manner as the above applicable network data is acquired.

On the other hand, the receiving-side terminal device current state monitoring unit 108 acquires from the terminal device on the receiving side the available network data representing the communication networks available to the terminal device on the receiving side.

Furthermore, the available network data holding unit 109 collects the available network data acquired by the receiving-side terminal device current state monitoring unit 108, and holds the data in a memory medium.

Then, the call control unit 105 according to this embodiment fulfills two main functions, in relation to each of the above functions, including: a first main function mainly in relation to the transmitting side; and a second main function mainly in relation to the receiving side.

As the first main function, upon receipt of the transmission request from the terminal device on the transmitting side, the call control unit 105 performs a call control based upon the applicable network data and the available network data held by the transmitting-side information acquisition holding unit 104 and the communication network current state data held by the communication network current state data holding unit 103.

As the second main function, upon receipt of the reception request from the terminal device on the receiving side, the call control unit 105 concurrently transmits call control signals each together with a call identifier for identifying a call to each communication network estimated to be available by the terminal device on the receiving side, based upon the available network data held by the available network data holding unit 109. Moreover, when each call response to the call control signals concurrently transmitted is received from each of the communication networks, the communication network to be used for the terminal device on the receiving side is determined based upon call control condition information representing a condition relating to the call control and communication resource information included in a single call response received in a relatively early order.

(Configuration Example of Terminal Device)

Figure 2:
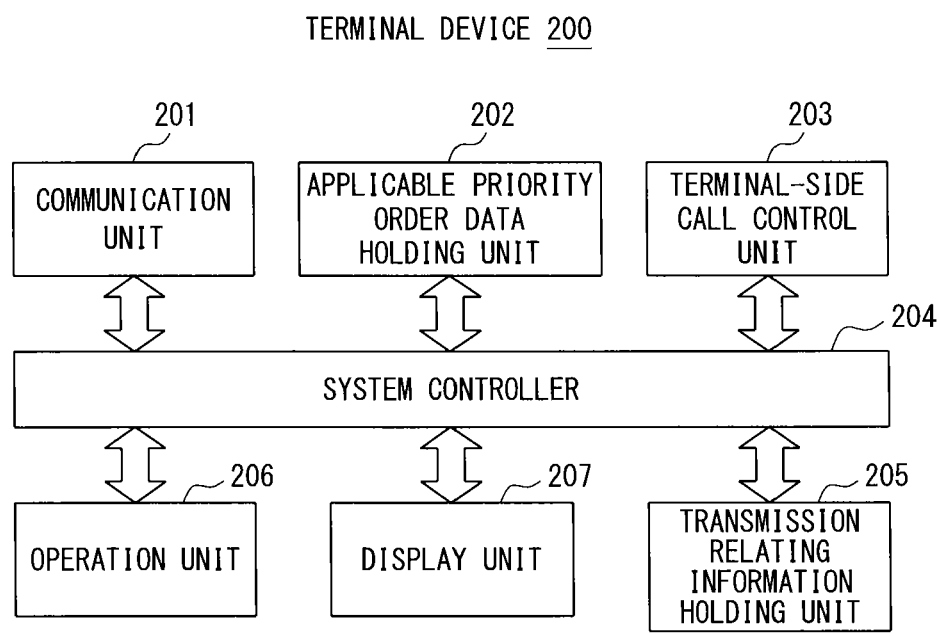
FIG. 2 is a functional block diagram illustrative of a configuration of a terminal device according to an embodiment of the present invention.

FIG. 2 is a functional block diagram illustrative of a configuration of a terminal device according to an embodiment of the present invention.

This terminal device 200 is configured as a mobile communication device, in which a communication unit 201, an applicable priority order data holding unit 202, and a terminal-side call control unit 203 are coupled to a system controller 204.

To the system controller 204, a transmission relating information holding unit 205, an operation unit 206, and a display unit 207 are further connected.

The system controller 204 manages each of the communication unit 201, the applicable priority order data holding unit 202, the terminal-side call control unit 203, and the transmission relating information holding unit 205 in an integrated manner, according to an external operation on the operation unit 206 or spontaneously so as to cause each of them to perform its function, and in addition, achieves an a man-machine interface serving mainly as an output function by means of the display unit 207.

That is, the above functional parts function as follows in cooperation with the system controller 204.

The communication unit 201 performs various types of communication with the exterior, and acquires data for the corresponding functional part and transmits the data generated by the corresponding functional part to the exterior.

When the terminal device 200 is a mobile communication terminal device, the communication unit 201 is configured to communicate with a base transceiver station of a coverage area where the terminal device 200 is located via a wireless transmission line.

The applicable priority order data holding unit 202 holds the applicable priority order data representing the priority order in selecting the communication network adaptable to the call setting relating to the transmission request.

Then, the terminal-side call control unit 203 according to this embodiment fulfills the two main functions including the first main function in the case where the terminal device 200 is a transmitting side, and the second main function in the case where the terminal device 200 is a receiving side mainly.

As the first main function, the terminal-side call control unit 203 issues the transmission request to the call controller 100 according to the external operation on the operation unit 206, and in addition, starts a call setting process adaptable with the communication network with the priority order based upon the applicable priority order data held by the applicable priority order data holding unit 202.

As the second main function, when the call control signals that the call controller 100 have transmitted concurrently through each of the communication networks estimated to be available to the terminal device on the receiving side (corresponding to the terminal device 200) are received through the communication unit 201, the terminal-side call control unit 203 causes the communication unit 201 to transmit a call response including the communication resource information representing a communication resource available to the terminal device together with a prescribed identifier for identifying a call through each of the communication networks to the call controller 100.

In this embodiment, in relation to the above-described first main function, when receiving from the call controller 100 an applicable network change notification of notifying that another communication network that is different from the communication network in the priority order based on the applicable priority order data held by the applicable priority order data holding unit 202, the call setting process that has once started as described above is cancelled.

When the call setting process is cancelled in this manner, a new transmission request is generated with the condition that the communication network notified in the applicable network change notification notified from the call controller 100 is adaptable to the call setting, and then such a new transmission request is transmitted.

(Configuration Example of Call Control System)

FIG. 3 is a conceptual diagram illustrative of a configuration example of a call control system including parts relating to the present invention.

The call control system of FIG. 3 is an example of the call control system for making a call control in a mobile communication system.

In the call control system 10, when a terminal device 210 on the transmitting side issues a transmission request, the call controller 100 makes an optimal call setting according to the transmission request and establishes a communication path to a terminal device 220 on the receiving side.

For convenience of description, FIG. 3 symbolically illustrates the two terminal devices 210 and 220, on the transmitting side and receiving side, respectively, and a single call controller 100 to correspond thereto. However, it is to be noted that the call control system 10 according to the present invention may be configured to include more terminal devices and call controllers, each having the similar configuration.

The call controller 100 has the configuration described above, with reference to FIG. 1, and is capable of selectively applying plural communication networks and controlling the call settings.

On the other hand, the terminal device 210 and the terminal device 220 may be configured to have similar specifications. When focusing on a case where the terminal device is used at least as the terminal device on the transmitting side, the terminal device has the configuration as described above, with reference to FIG. 2.

Additionally, both of the terminal device 210 and the terminal device 220 each have the specifications allowing plural communication networks to be selectively made available.

In FIG. 3, plural networks as described above include communication networks A, B, C, D, E, and F, with the abbreviation of communication network of "communication NW".

The terminal device 210 on the transmitting side is located in an area 31 where the communication networks B, C, D, E, and F are available. It is assumed that, however, the communication network B indicated by a broken line is currently in an unavailable state, because a failure is occurring there.

Meanwhile, the terminal device 220 on the receiving side is located in an area 32, and such a location is under the management of the call controller 100.

(Overview of Effects in Call Control System)

Figure 5:
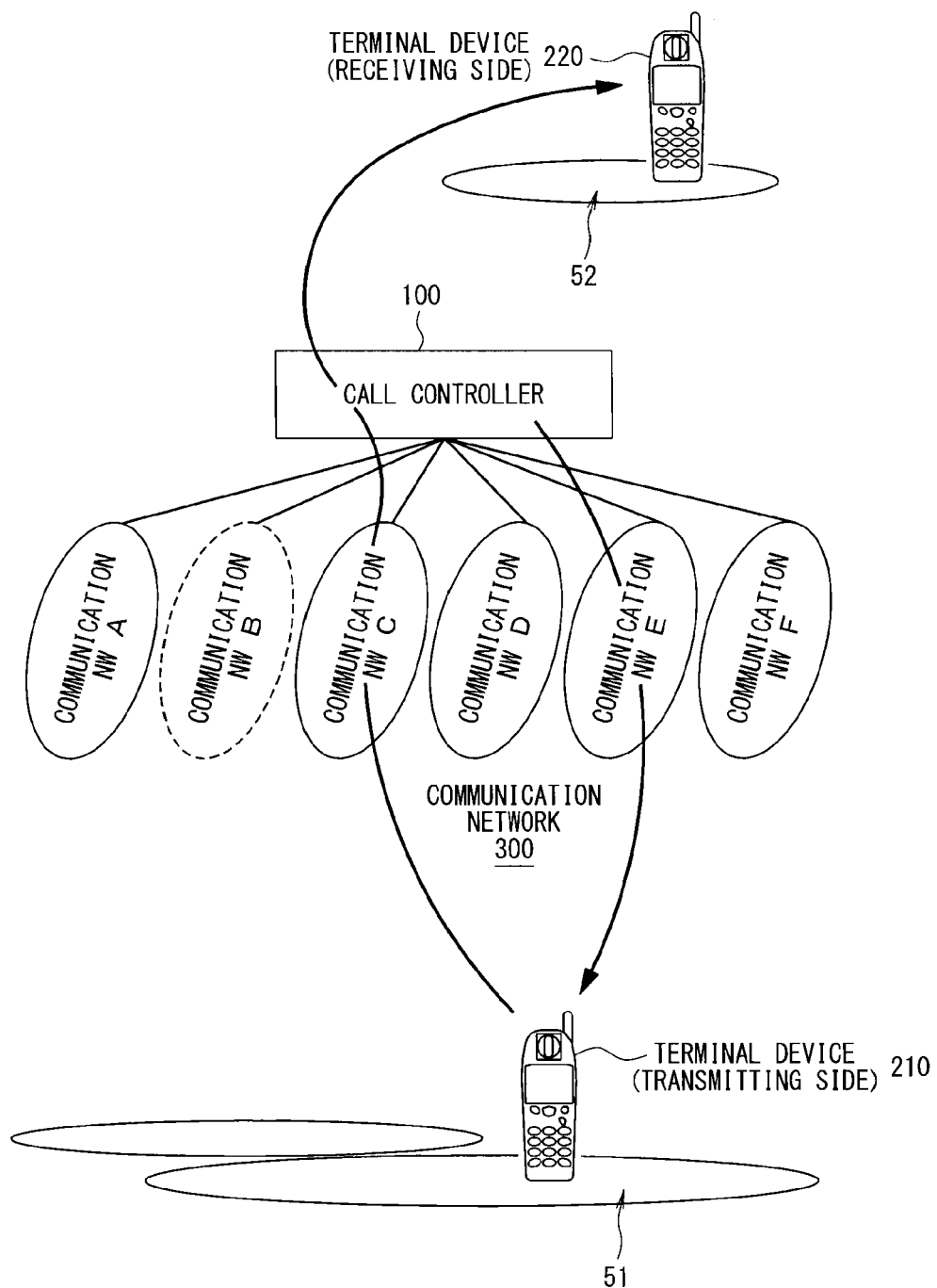
FIG. 5 is a conceptual diagram illustrative of partial effects in the call control system of FIG. 3.

FIG. 4 and FIG. 5 are conceptual diagrams illustrative of partial effects in the call control system of FIG. 3.

Effects according to the embodiment of the present invention are characteristic in the determination of the communication network to be used for the terminal device on the receiving side will be described later, with reference to FIG. 7 to FIG. 9.

In FIG. 4, the same components have the same reference numerals as those of FIG. 3 already described.

There are communication networks A, B, C, D, E, and F available to the terminal device 210 on the transmitting side in consideration of its physical configuration (that is, in consideration of the specifications as a product). However, the communication networks B, C, D, E, and F are applicable under the condition that the terminal device 210 on the transmitting side is located in an area 41 illustrated in FIG. 4.

Herein, however, it is assumed that in reality, a failure is occurring at the communication network B and the network B is currently unavailable.

The configuration of the terminal device 210 on the transmitting side has the same one as the terminal device 200 described above, with reference to FIG. 2.

When a user operates the operation unit 206 to make a transmission operation to the terminal device 220 on the receiving side (it is currently located in an area 42), a call control signal is transmitted to the call controller 100 via the communication network with the highest priority order based upon the data held by the applicable priority order data holding unit 202.

The applicable priority order data held by the applicable priority order data holding unit 202 represents the priority order in the selection of the communication network to be adaptable to the call setting for the transmission request, as described above. As an example, it has a data structure illustrated in FIG. 6.

FIG. 6 is a diagram illustrative of a data structure held by the applicable priority order data holding unit 202 of the terminal device 200 of FIG. 2.

In the example of FIG. 6, the data structure is employed to be suited for the management of the priority order in the selection of the communication network for every type of a call, whether it is a voice call or an e-mail.

This priority order is regularly updated, for example. That is to say, when the condition that in what area the terminal device is located or the like is changed, the priority order is updated according to this change.

In a case where the terminal device 210 on the transmitting side is located in the area 41 illustrated in FIG. 4, in order to make a voice communication, the communication network E is a candidate with the highest order to be adaptable to the call setting based upon the applicable priority order data of FIG. 6.

Accordingly, the terminal device 210 on the transmitting side firstly uses the communication network E to transmit the transmission request to the call controller 100.

This transmission request includes the applicable network data representing an applicable communication network in the transmitting-side area 41, and the available network data representing a communication network with which the specifications of the terminal device 210 on the transmitting side can be met, together with a call identifier for identifying a call.

Meanwhile, the configuration of the call controller 100 has been described above with reference to FIG. 1.

The data representing the state of the communication network that has been detected by the communication network current state monitoring unit 102 is held by the communication network current state data holding unit 103.

The call controller 100 temporarily holds on the transmitting-side information acquisition holding unit 104 the applicable network data and the available network data together with the identifier, as described above, included in the transmission request transmitted from the terminal device 210 on the transmitting side as described above.

The call controller 100 recognizes the current state including failures, congestions, and the like of the communication networks held by the communication network current state data holding unit 103, reflecting the recognition, and determines the optimal communication network to be used for the call setting.

FIG. 4 is symbolically illustrative of a case where the communication network determined to be optimal described above by the call controller 100 match the communication network tried to be adaptable as the highest priority order by the terminal device 210 on the transmitting side (that is, the communication network E is selected in both ways).

Then, the call controller 100 continues to control the call setting with the operation of the call control unit 105, thereby resulting in the establishment of the call setting with the use of the communication network E.

Also in FIG. 5, the corresponding parts in FIG. 3 and FIG. 4 have the same reference numerals.

Also in this case, it is assumed that a transmission operation is made by the terminal device terminal device 210 on the transmitting side located in the area 51 to the terminal device 220 on the receiving side (it is currently located in an area 52).

In the case of FIG. 5, however, it is assumed that the communication network adaptable to the call setting selected by the terminal device 210 on the transmitting side depending on the data having the structure of FIG. 6 held by the applicable priority order data holding unit 202 (the communication network E in the case of data of FIG. 6) does not match the communication network selected by the call controller 100 to be optimal.

The case where there is such a mismatched described above occurs is, for example, a case where a congestion is occurring at the communication network E at present moment and the terminal device 210 does not have a detection function and does not recognize this situation, but the communication network current state monitoring unit 102 of the call controller 100 is capable of detecting and recognizing this situation.

In such a case, the call controller 100 stops the control for the call setting by applying the communication network E with the operation of the call control unit 105, and then notifies the terminal device 210 on the transmitting side of the stop via the same communication network E.

Also in such a case, the call control unit 105 of the call controller 100 selects another communication network, for example, the communication network C depending on the data representing the current state of the communication network held by the communication network current state data holding unit 103, and also notifies the terminal device 210 on the transmitting side of the selection result.

The terminal device 210 on the transmitting side that has received the above notification issues the transmission request with the condition of using the communication network C to the call controller 100 once again.

On receipt of it, in the call controller 100, the call control unit 105 makes the call setting under the condition of using the communication network C, and then the setting is established.

As is easily understood by the description heretofore, according to the call control system 10, the call control unit 105 of the call controller 100 performs a call control by referring to the applicable network data and available network data, as described above, supplied to be included in the transmission request from the terminal device on the transmitting side.

On this occasion, additionally, by referring to the current state data of the communication network acquired by the communication network current state monitoring unit 102 described above at the same time, so that the optimal communication network is selected in consideration of the current state including the failures, congestions, and the like of the communication networks.

Therefore, according to the call controller, the terminal device, and the call control system in this embodiment, the optimal call setting is enabled in consideration of not only the data held by the terminal device but also the data relating to the current states of the communication networks held by the call controller but are not generally held by the terminal device.

(Effects of Parts According to Embodiments of the Present Invention)

Figure 7:
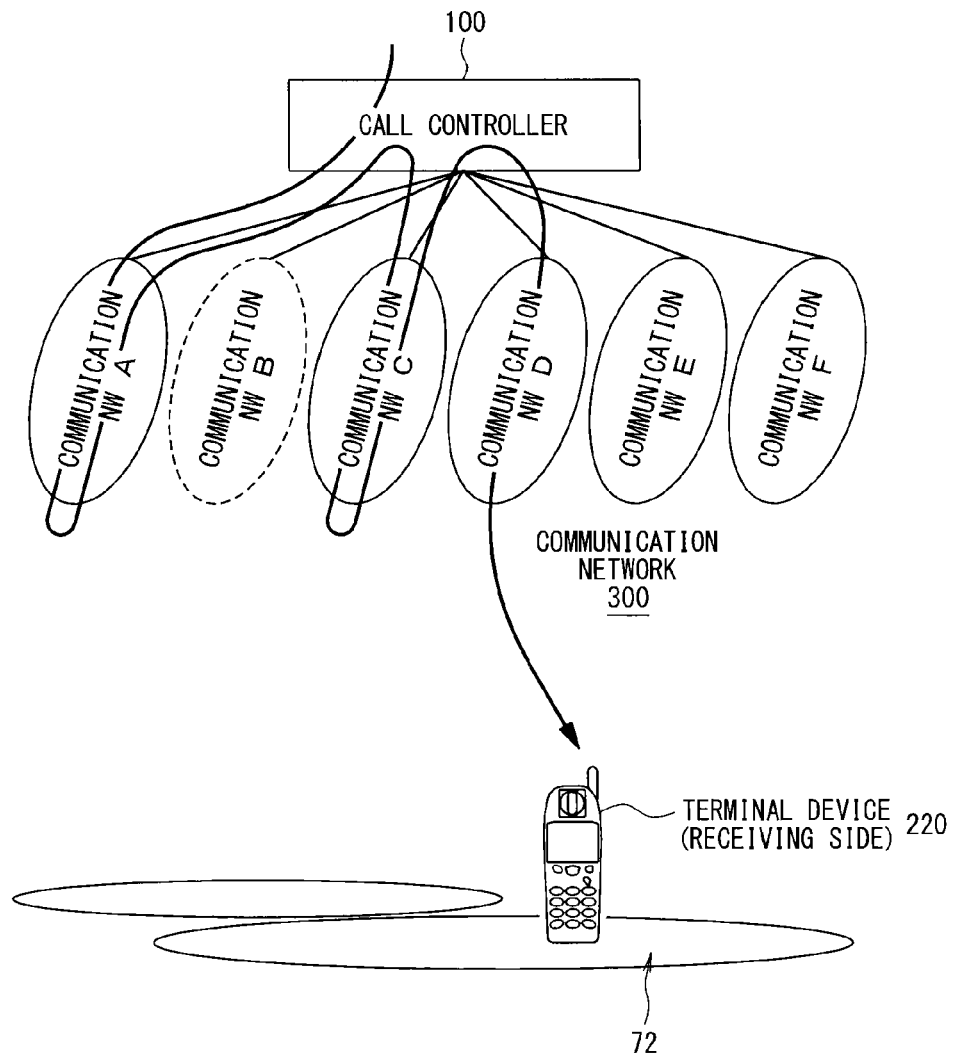
FIG. 7 is a conceptual diagram illustrative of effects of parts relating to embodiments of the present invention in the call control system of FIG. 3.
Figure 8:
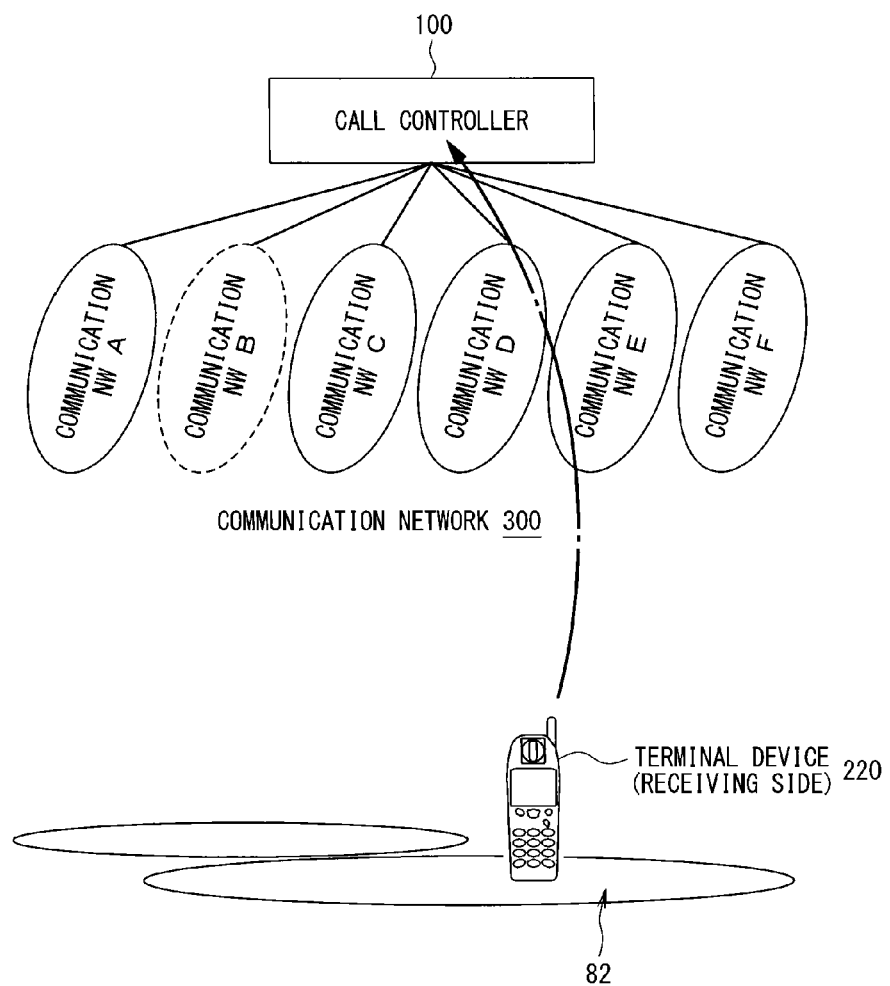
FIG. 8 is a conceptual diagram illustrative of effects of parts relating to embodiments of the present invention in the call control system of FIG. 3.

FIG. 7, FIG. 8, and FIG. 9 are conceptual diagrams illustrative of effects of parts relating to embodiments of the present invention with a characteristic in the way of determining a communication network to be used for the terminal device on the receiving side, in the call control system of FIG. 3. In each of the figures, the corresponding parts in FIG. 3 and FIG. 5 have the same reference numerals.

Among them, FIG. 7 is a conceptual diagram illustrative of effects of a case where the present invention is not adaptable, for promoting the understanding of the characteristics of the present invention.

In FIG. 7, the terminal device 220 on the receiving side is located in an area 72 under the management of the call controller 100.

The call controller 100, as represented by closing lines in the upper part of the drawing, for the time being, learns available communication networks to each terminal device (Y, Z, . . . ), that is available network data.

In the illustrated example, the communication networks A, C, and D are recognized as available to the terminal device Y, whereas the communication networks C, D, and F are recognized as available to the terminal device Z. In this case, the terminal device briefly indicated by Y is the terminal device 220 in the lower part of the drawing.

The recognition drawn in the closing lines described above is regularly updated, but the situations are momentarily changing. Therefore, as the time passes by, it is always probable to generate a gap from the actual situations.

Accordingly, the call controller 100 sequentially tries a reception process to plural communication networks A, C, and D estimated to be available for the time being according to the above recognition, so that the communication network to be used for the terminal device 220 on the receiving side matches the actual situations. The call controller 100 determines whether or not the communication network is actually available according to the presence or absence of a response on the terminal device 220.

Therefore, as the number of the available communication networks is increased, the time to reach the situation where the call setting is established and the communication is made possible is delayed.

FIG. 8 is a conceptual diagram illustrative of interactions between the call controller 100 and the terminal device 220 on the receiving side in the call control system 10 in the case where the technique of the present invention is adaptable.

If there are plural communication networks available to an opposed terminal device, that is the terminal device 220 on the receiving side, to which the terminal device on the transmitting side, not illustrated in FIG. 8, has issued a connection request, a single communication network to be used by the terminal device 220 on the receiving side has to be determined.

In this case, the terminal device 220 is located in an area 82 under the management of the call controller 100.

The terminal device 220 on the receiving side regularly notifies the call controller 100 of the available communication network, as conceptually indicated by a dashed line.

The call controller 100 holds the data of the available communication networks (available network data) notified as described above, on the available network data holding unit 109 that has been described with reference to FIG. 1.

Information on subscribers held by the call controller 100, as described above, is illustrated in the closing lines in the upper part of FIG. 8.

As illustrated, a number (that is a telephone number) of the terminal device for every subscriber ID (1, 2), its coverage area (13, 17), and available communication network (available network data) in such a state are held in the call controller 100 (in the available network data holding unit 109 thereof in FIG. 1).

In the example of FIG. 8, the terminal device having an ID 1 is located in a coverage area 13 and available communication networks in such a state are C, D, and E.

In addition, the terminal device having an ID 2 is located in a coverage area 17 and available communication networks in such a state are A, B, C, and D.

FIG. 9 is a conceptual diagram illustrative of effects in the call control system 10 as an embodiment of the present invention. In this case, the terminal device 220 is located in an area 92 under the management of the call controller 100.

As has been described in the same manner as FIG. 8, if there are plural communication networks available to an opposed terminal device, that is the terminal device 220 on the receiving side, to which the terminal device on the transmitting side, not illustrated in FIG. 9 has issued a connection request, a single communication network to be used by the terminal device 220 on the receiving side has to be determined.

In the call controller 100, upon receipt of a reception request from the terminal device 220 on the receiving side, the call control unit 105 thereof (FIG. 1) concurrently transmits call control signals each together with a call identifier for identifying a call to each of the communication networks (for example, D and E) estimated to be available by the terminal device on the receiving side, based upon the available network data held by the available network data holding unit.

Moreover, upon receipt of a call response from each of the communication networks (D and E) to the call control signals concurrently transmitted, the communication network to be used by the terminal device 220 on the receiving side is determined, based upon call control condition information representing a condition relating to the call control and communication resource information included in a single call response received in a relatively early order.

Hereupon, as a single call response received in a relatively early order, in particularly, the call response received in the earliest order may be selected so that the communication resource information included in the call response may be adaptable to determine the communication network to be used by the terminal device 220 on the receiving side.

In this case, the communication network to be used for reception can be determined more promptly.

In the meantime, in the terminal device 220, when the communication unit 201 receives the call control signals concurrently transmitted through each of the communication networks (D and E) estimated by the call controller 100 to be available to the terminal device on the receiving side, the terminal-side call control unit 203 thereof (FIG. 2) respectively returns the call responses each including the communication resource information contributing to the determination of the communication network together with the same identifier as described above through each of the communication networks (D and E) to the call controller 100.

The communication resource information described above corresponds to the data representing the available communication network in an area (available network data) and the data representing the communication network available to the terminal device. In the call controller 100, the communication resource information contributes to a determination process of determining the communication network to be used for reception.

In the determination process, of determining the communication network to be used for reception, performed in the call controller 100, what should be considered are not only the above communication resource information but also call control condition information including the congestion state and failure state (including a case of malfunction) of the communication network and service information with which the terminal device on the transmitting side is to be connected.

(Detail of Operation of Call Control System)

Hereinafter, an operation in an example of the call control system, which has been described heretofore with reference to FIG. 1 to FIG. 9, will be described in detail with reference to a sequence chart.

(Location Registration)

Figure 10:
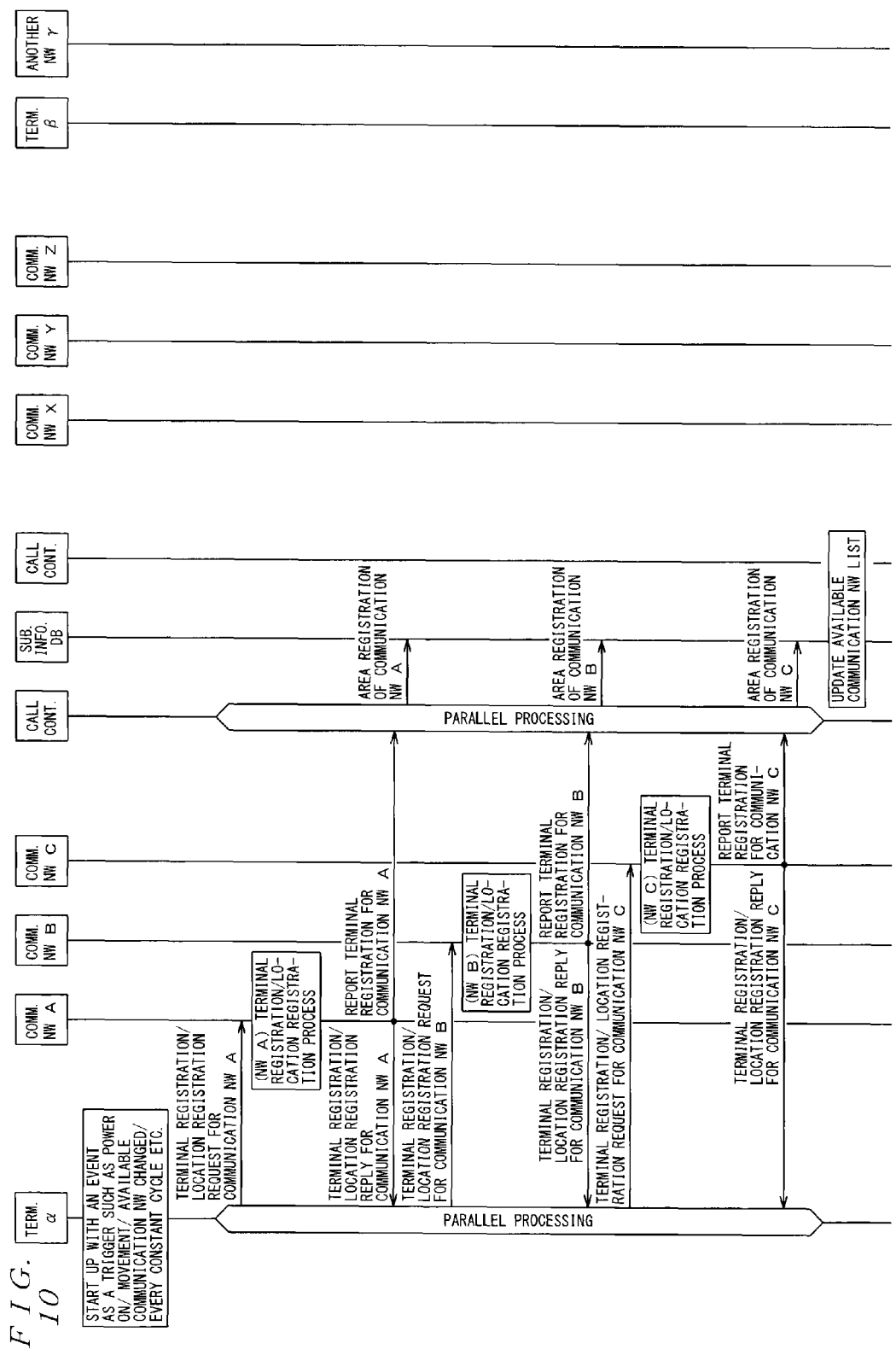
FIG. 10 is a sequence chart for describing an operation of location registration in the call control system according to an embodiment of the present invention.

FIG. 10 is a sequence chart for describing an operation of location registration relating to the terminal device as a preparatory stage of the call control operation in the call control system.

In FIG. 10, for instance, a terminal device α that can function as a terminal device on the transmitting side is briefly indicated by a terminal α. A terminal device β and a terminal device γ are also briefly indicated, but the description of the location registration will be given with the use of the terminal device α.

The location registration for the terminal device β and the terminal device γ is same as that for the terminal device α.

The location registration for the terminal device α will be performed as an opportunity of an event of, for example, powering ON, moving its location, changing the available communication network, passing a certain period, and the like.

The location registration processes for the communication network A, the communication network B, and the communication network C are seemingly performed in parallel as indicated by "parallel processing" in time-sharing processing.

Focusing on the process for the communication network A, the terminal device α firstly issues a request of a terminal registration and a location registration to the communication network A. In response to this, the terminal registration and the location registration are performed in the communication network A. This result is notified to the terminal device α, the call controller, and the subscriber database indicated by "subscriber DB" in the drawing. The subscriber database may be installed in the call controller, but corresponds to an external Home Location Register (HLR) in this example.

Hereinafter, the location registration processes for the communication network B and the communication network C are performed in the same manner according to the "parallel processing". As a result of this "parallel processing", the data (list) relating to the available communication network in the subscriber database is updated.

(Transmission Request in Terminal Device on Transmitting Side)

Figure 11:
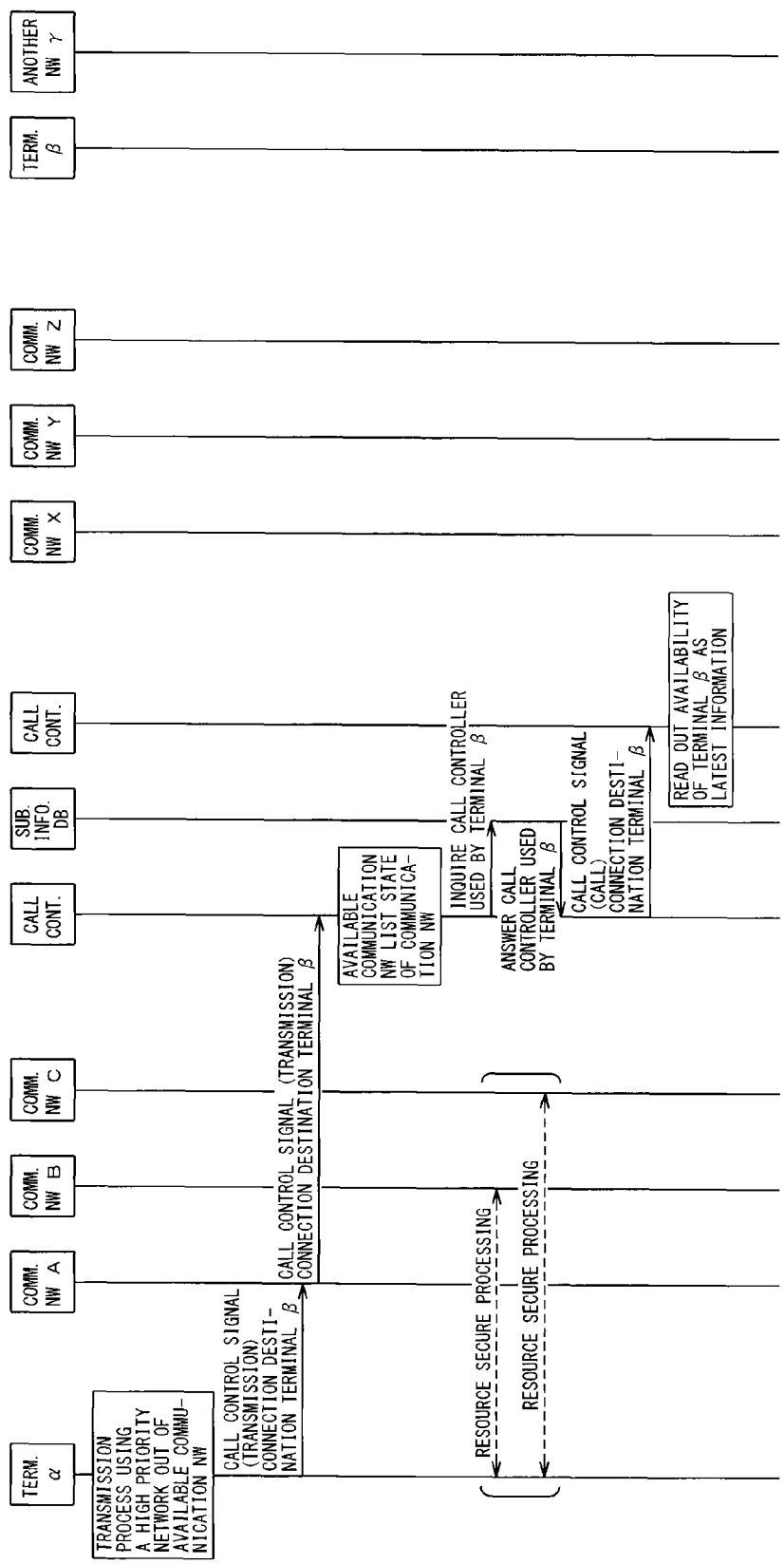
FIG. 11 is a sequence chart of a case where a transmission request from the terminal device on the transmitting side is transmitted to the call controller.

FIG. 11 is a sequence chart of a case where a call control signal, which is a transmission request from the terminal device α on the transmitting side to a connection destination that is the terminal device β on the receiving side, is transmitted to the call controller.

Referring to FIG. 4 to FIG. 6, as described above, the call control signal that is the transmission request from the terminal device α to the terminal device β is transmitted to the call controller through the communication network A.

This call control signal includes the applicable network data and the available network data, described above, further together with the call identifier.

In response thereto, referring to FIG. 4 to FIG. 6, the call controller specifies and recognizes the available communication network and the applicable communication network to correspond to the call (communication content) by use of the call identifier.

On the other hand, the call controller that is being used by the terminal device β is inquired for depending on the data held in the subscriber database, and its reply is acquired.

Based upon this reply, the correspondence with the call (communication content) by use of the call identifier is specified and the call control signal that is a call is transmitted to the call controller that is being used by the terminal device β.

As a result, the call controller that is being used by the terminal device β reads out latest information on availability relating to the terminal device β.

Additionally, as indicated by a broken line, a resource release process is performed for the communication network B and the communication network C that are not used for the call setting for the time being, so that the use efficiency of the resources as the whole call control system can be kept at high level.

(Reception Process)

Figure 12:
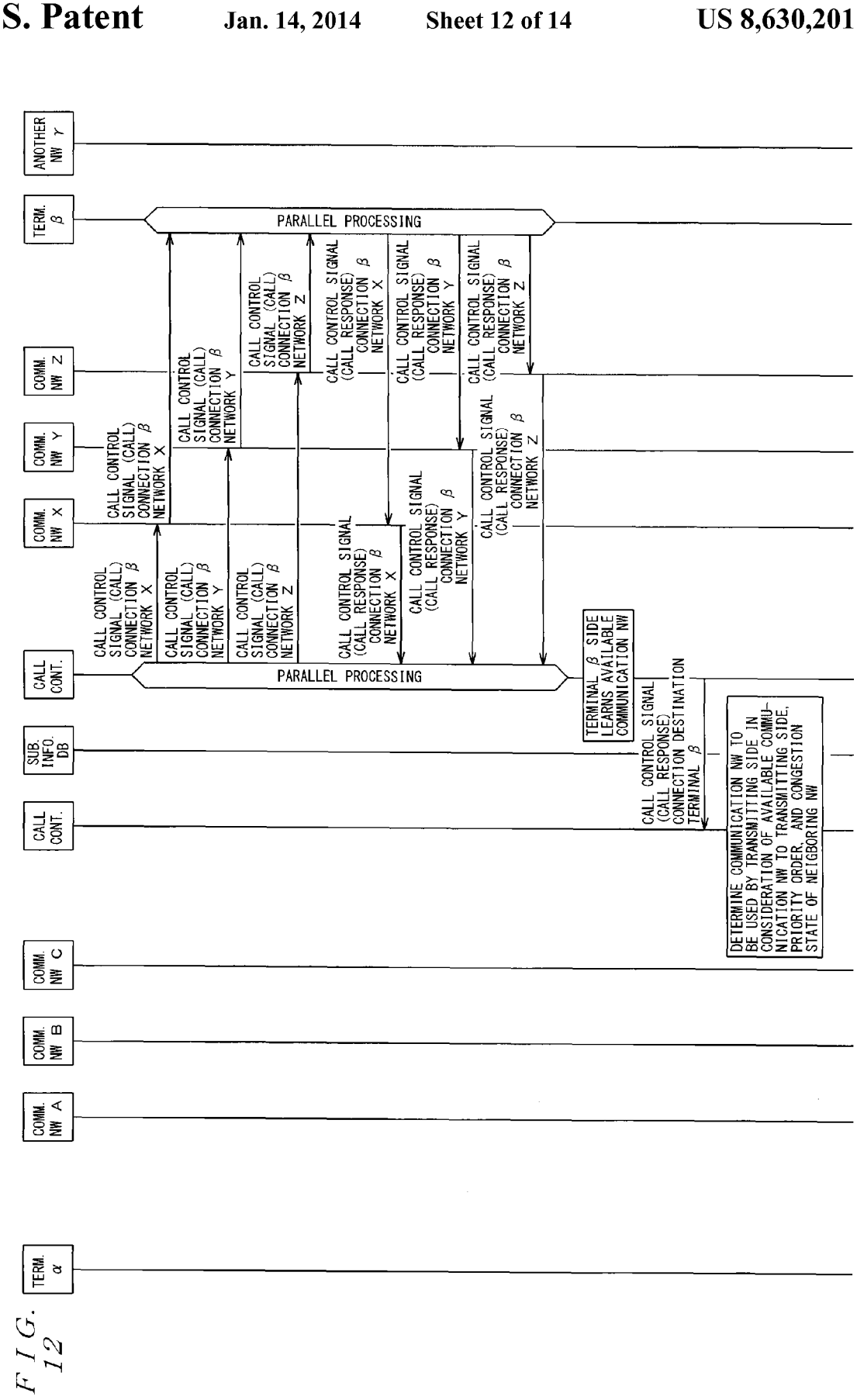
FIG. 12 is a sequence chart relating to a reception process between the call controller that is being used by the terminal device on the receiving side and the call controller.

FIG. 12 is a sequence chart relating to a reception process between the call controller that is being used by the terminal device β on the receiving side and the call controller. The effects of the embodiments of the present invention are remarkably represented in the sequence chart of FIG. 12.

This reception process is also seemingly performed in parallel in a time-sharing manner, as indicated by "parallel processing" in FIG. 12.

The call control signals seemingly transmitted and received in parallel each have an identical call identifier, with which each of the corresponding processing units identifies that these call control signals are related to an identical call.

When all of the call control signals with the terminal device β as the connection target (receiving side) are simultaneously transmitted from the call controller through the communication networks X, Y, and Z, respectively, the call control signals as call responses are returned from the terminal device β through the communication networks X, Y, and Z, respectively in response thereto.

The timings when the call control signals, each of which serves as the call response corresponding to the parts indicated as the "parallel processing" as illustrated, are made to return to the original transmission source are different in the arrival order.

In this embodiment, the communication network to be used by the terminal device on the receiving side is determined based upon the communication resource information included in a single call response that has been received in a relatively early order.

As described, the communication resource information corresponds to the data representing the available communication networks in an area (available network data) and the data representing the communication networks with which the terminal device is capable of communicating.

Additionally, in the determination process of the communication network to be used for reception, performs the determination process in consideration of not only the communication resource information described above but also the priority order relating to the application of the communication network, the congestion state and the failure state, and the service information with which the terminal device on the transmitting side is connected.

In addition, as a single call response that has been received in a relatively early order, in particular, the call response that has been received in the earliest order may be selected, so that the communication resource information included in the call response may be adaptable to the determination of the communication network to be used by the terminal device on the receiving side.

In this case, the communication network to be used for reception can be determined more promptly.

In other words, as a result of the "parallel processing", the call controller learns the available communication network that can be used by the terminal device β.

Subsequently, the call control signal as a call response with the condition that the connection target is the terminal device β is returned to the call controller used by the terminal device α on the transmitting side from the call controller used by the terminal device β. This call control signal also has an identical call identifier to the previous one.

The call controller, upon receipt thereof, determines the communication network to be used by the transmitting side and the receiving side in consideration of the available communication networks to the transmitting side and the receiving side, the priority order, and the congestion states of neighboring communication networks.

In the course of determining the communication network as described above, the process procedures are different between a case where the communication network that the terminal device on the transmitting side originally selected is used for the call setting without change, and a case where the originally selected communication network is changed and a different communication network is used for the call setting.

(Two Aspects in Call Setting)

Figure 13:
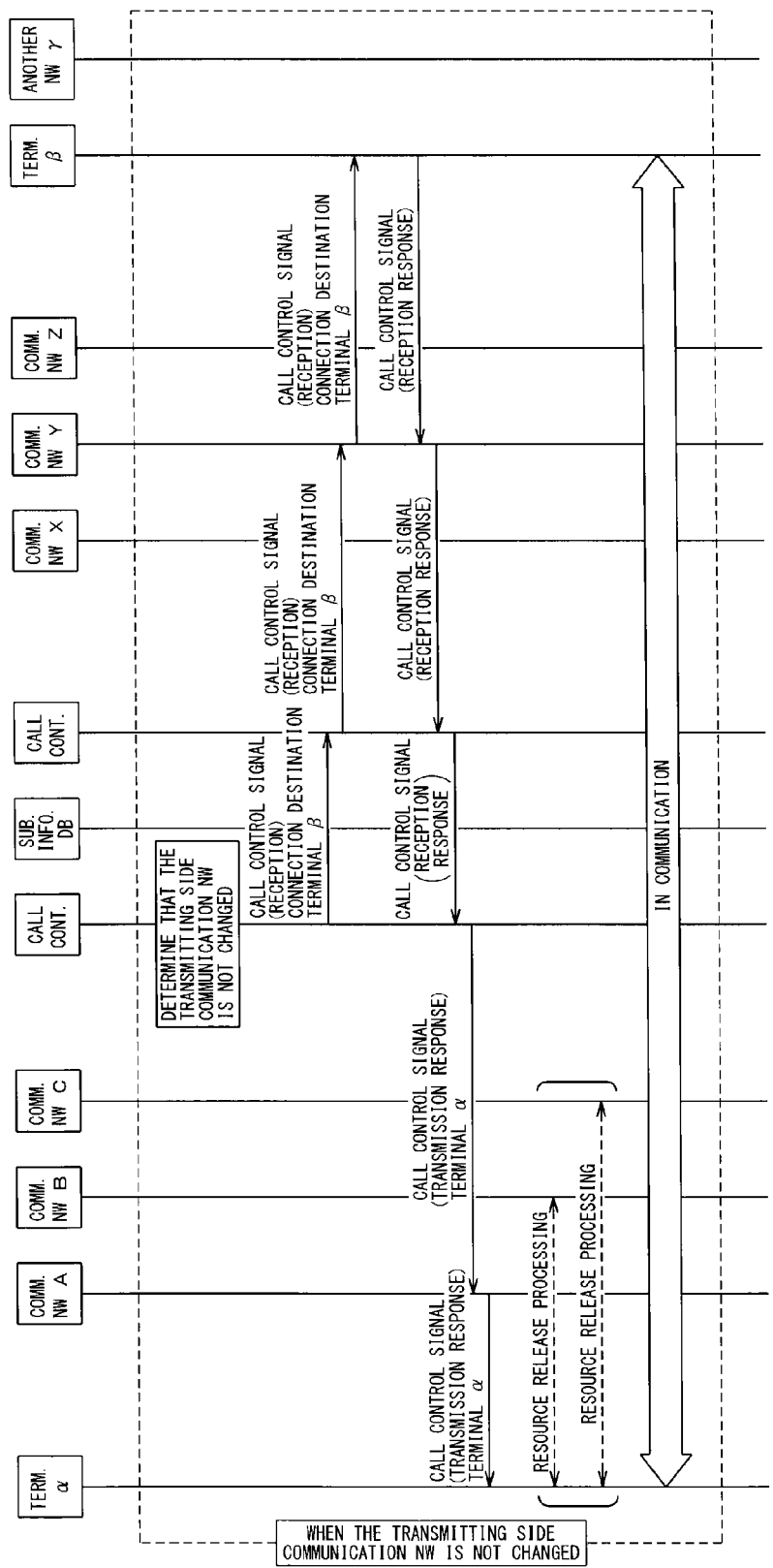
FIG. 13 is a sequence chart of a case where the communication network that the terminal device originally selected is used for the call setting without change.

FIG. 13 is a sequence chart of the case where the communication network that the terminal device on the transmitting side originally selected is used for the call setting without change, as in the former case.

Figure 14:
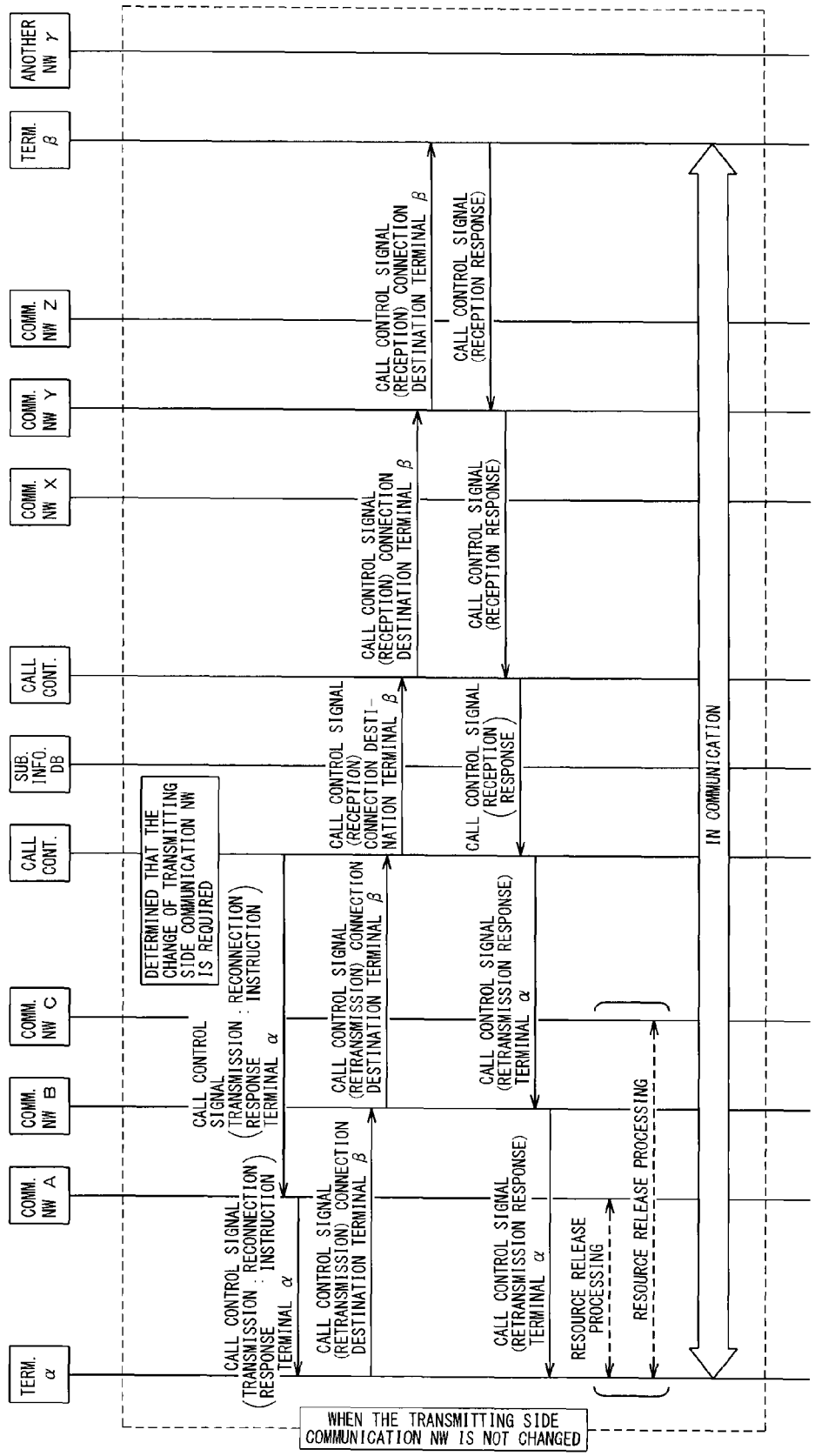
FIG. 14 is a sequence chart of a case where the communication network that the terminal device originally selected is changed and a different communication network is used for the call setting.

Moreover, FIG. 14 is a sequence chart of the case where the communication network that the terminal device originally selected is changed and a different communication network is used for the call setting, as in the latter case.

(First Aspect in Call Setting)

In FIG. 13, when the call controller used by the terminal device α on the transmitting side determines that the communication network that the terminal device on the transmitting side originally selected is used for the call setting without change, the call control signal that is the reception request is sequentially transmitted by way of a route from the call controller used by the terminal device β on the receiving side, through the communication network Y, to the terminal device β. Also in the transmission of the call control signal by way of this route, any of the call control signals included in this route has the identical call identifier to that described above.

Each of the corresponding parts is capable of identifying the identity of the call (communication content) with certainty depending on this identifier.

The terminal device β that has received the call control signal that is the reception request via the above-described course, in response thereto, returns the call control signal as a reception response by way of a route from the terminal device β, through the communication network Y and the call controller used by the terminal device β, to the call controller used by the terminal device α on the transmitting side. In this case, any of the call control signals has the identical call identifier to that described above.

Each of the corresponding parts is capable of identifying the identity of the call (communication content) with certainty depending on this identifier.

Furthermore, the call control signal is transmitted as a transmission response by way of a route from the call controller used by the terminal device α on the transmitting side, through the communication network A, to the terminal device α on the transmitting side.

The call setting process continues under the condition that the communication network that the terminal device on the transmitting side originally selected is used without change, and then the call setting is established.

That is, in FIG. 10, the communication indicated as "in communication" is established.

Moreover, as indicated by a broken line, the resource release process is performed for the communication network B and the communication network C that are determined not to be used for the call setting, so that the use efficiency of the resources as the whole call control system can be kept at high level.

(Second Aspect of Call Setting)

In FIG. 14, when the call controller used by the terminal device α on the transmitting side determines that the communication network that the terminal device on the transmitting side originally selected is changed and a different communication network is used for the call setting, the call control signal that is the transmission response representing a reconnection instruction is transmitted by way of a route from this call controller, through the communication network A, to the terminal device α.

On receipt thereto, the terminal device α this time transmits the call control signal that is a retransmission through the communication network B to the call controller used by the terminal device α on the transmitting side.

On receipt of the call control signal, the call controller transmits the call control signal as a reception request to the terminal device β by way of a route from the call controller (the call controller used by the terminal device α), through the call controller used by the terminal device β and the communication network Y, to the terminal device β.

On receipt of the call control signal as the reception request, the terminal device β transmits the call control signal as a receiving-side response to the call controller used by the terminal device α, by way of a route from the terminal device β, through the communication network Y and the call controller used by the terminal device β, to the call controller used by the terminal device α.

On receipt of the call control signal as the receiving-side response, the call controller used by the terminal device α transmits the call control signal as the transmission response to the terminal device α, by way of a route from the call controller (the call controller used by the terminal device α), through the communication network B, to the terminal device α.

Any of the call control signals in FIG. 4 has the identical call identifier to that described above.

Each of the corresponding parts is capable of identifying the identity of the call (communication content) with certainty depending on this identifier.

The call setting process is performed once again under the condition that the communication network that the terminal device on the transmitting side originally selected is changed, and then the call setting is established.

That is, in FIG. 14, the communication indicated as "in communication" is established.

Moreover, as indicated by a broken line, the resource release process is performed for the communication network B and the communication network C that are not used for the call setting for the time being, so that the use efficiency of the resources as the whole call control system can be kept at high level.

As understood by the sequence chart of FIG. 12 as described heretofore, the present invention is conceivable as a technical concept of the invention in the following method.

That is, there is provided a call control method in a call control system comprising a call controller for performing a call control by selectively using a plurality of communication networks and a plurality of terminal devices, the call control method comprising:

in the call controller,
acquiring from a terminal device on a receiving side available network data representing a communication network available to the terminal device on the receiving side;

holding the available network data acquired by the monitoring; and

Upon receipt of a reception request from the terminal device on the receiving side, concurrently transmitting call control signals each having a call identifier for identifying a call to the plurality of communication networks, respectively, estimated to be available to the terminal device on the receiving side, based upon the available network data held by the holding, and upon receipt of each of call responses to the call control signals concurrently transmitted, from each of the plurality of communication networks, determining a communication network to be used by the terminal device on the receiving side based upon call control condition information representing a condition relating to the call control and communication resource information included in a single call response received in a relatively early order, in each of the plurality of terminal devices,
communicating with the exterior; and
when the communicating receives the call control signals concurrently transmitted through the plurality of communication networks, respectively, estimated by the call controller to be available to the terminal device on the receiving side, returning a call response including the communication resource information together with the identifier through each of the plurality of communication networks to the call controller.

INDUSTRIAL AVAILABILITY

The present invention is applicable in an effective manner to achieve a call control system, a call controller, a terminal device, and a call control method of this type, whereby a communication network to be used by a terminal device on the receiving side is determined in an efficient manner to allow communication promptly, in a communication where plural communication networks are selectively used.

REFERENCE SIGNS LIST

10 call control system
31, 32, 41, 42, 51, 52, 72, 82, 92 area
100 call controller
101 call control unit

The invention claimed is:

1. A call control system comprising a call controller for performing a call control by selectively using a plurality of communication networks and a plurality of terminal devices, the call controller comprising:

a receiving-side terminal device current state monitoring unit for acquiring from a terminal device on a receiving side available network data representing a communication network available to the terminal device on the receiving side;

an available network data holding unit for holding the available network data acquired by the receiving-side terminal device current state monitoring unit; and a call control unit for, upon receipt of a reception request from the terminal device on the receiving side, concurrently transmitting call control signals each having a call identifier for identifying a call to the plurality of communication networks, respectively, estimated to be available to the terminal device on the receiving side, based upon the available network data held by the available network data holding unit, and for, upon receipt of each of call responses to the call control signals concurrently transmitted, from each of the plurality of communication networks, determining a communication network to be used by the terminal device on the receiving side based upon call control condition information representing a condition relating to the call control and communication resource information included in a single call response received in an order, each of the plurality of terminal devices comprising:
a communication unit for communicating with the exterior; and a terminal-side call control unit for, when the communication unit receives the call control signals concurrently transmitted through the plurality of communication networks, respectively, estimated by the call controller to be available to the terminal device on the receiving side, returning a call response including the communication resource information together with the identifier through each of the plurality of communication networks to the call controller.

2. The call control system according to claim 1, wherein the call control unit determines a communication network to be used by the terminal device on the receiving side by use of information, as the call control condition information, including at least any of a congestion state of the communication network, a failure state of the communication network, and service information with which a terminal device on a transmitting side is connected.

3. The call control system according to claim 1, wherein the call control unit determines a communication network to be used by the terminal device on the receiving side by use of information, as communication resource information included in the call response, including at least any of data representing a communication network available in an area where the terminal device is currently located and data representing a communication network with which the terminal device is capable of communicating.

4. The call control system according to claim 1, wherein the call control unit determines a communication network to be used by the terminal device on the receiving side by applying communication resource information, included in a call response received in an earliest order, as communication resource information included in the single call response received in the order.

5. A call controller, for performing a call control by selectively using a plurality of communication networks, adaptable to a call control system comprising the call controller and a plurality of terminal devices, the call controller comprising:
  a receiving-side terminal device current state monitoring unit for acquiring from a terminal device on a receiving side available network data representing a communication network available to the terminal device on the receiving side;
  an available network data holding unit for holding the available network data acquired by the receiving-side terminal device current state monitoring unit; and
  a call control unit for, upon receipt of a reception request from the terminal device on the receiving side, concurrently transmitting call control signals each having a call identifier for identifying a call to the plurality of communication networks, respectively, estimated to be available to the terminal device on the receiving side, based upon the available network data held by the available network data holding unit, and for, upon receipt of each of call responses to the call control signals concurrently transmitted, from each of the plurality of communication networks, determining a communication network to be used by the terminal device on the receiving side based upon call control condition information representing a condition relating to the call control and communication resource information included in a single call response received in an order.

6. The call controller according to claim 5, wherein the call control unit determines a communication network to be used by the terminal device on the receiving side by use of information, as the call control condition information, including at least any of a congestion state of the communication network, a failure state of the communication network, and service information with which a terminal device on a transmitting side is connected.

7. The call controller according to claim 5, wherein the call control unit determines a communication network to be used by the terminal device on the receiving side by use of information, as communication resource information included in the call response, including at least any of data representing a communication network available in an area where the terminal device is currently located and data representing a communication network with which the terminal device is capable of communicating.

8. The call controller according to claim 5, wherein the call control unit determines a communication network to be used by the terminal device on the receiving side by applying communication resource information, included in the a call response received in the an earliest order, as communication resource information included in the single call response received in the order.

9. A terminal device to be adaptable to a call control system comprising a plurality of the terminal devices and a call controller for performing a call control by selectively using a plurality of communication networks, the terminal device comprising:
  a communication unit for communicating with the exterior; and
  a terminal-side call control unit for, when the communication unit receives call control signals concurrently transmitted through the plurality of communication networks, respectively, estimated by the call controller to be available to the a terminal device on a receiving side, returning a call response including communication resource information together with a prescribed identifier through each of the plurality of communication networks to the call controller;
  wherein the terminal-side call control unit returns the call response including information together with the prescribed identifier, the information including at least any of data representing a communication network available in an area where the terminal device is currently located and data representing a communication network with which the terminal device is capable of communicating, through each of the plurality of communication networks to the call controller.

10. A call control method in a call control system comprising a call controller for performing a call control by selectively using a plurality of communication networks and a plurality of terminal devices, the call control method comprising:
  in the call controller,
  acquiring from a terminal device on a receiving side available network data representing a communication network available to the terminal device on the receiving side;
  holding the available network data acquired by the acquiring; and
  upon receipt of a reception request from the terminal device on the receiving side, concurrently transmitting call control signals each having a call identifier for identifying a call to the plurality of communication networks, respectively, estimated to be available to the terminal device on the receiving side, based upon the available network data held by the holding, and upon receipt of each of call responses to the call control signals concurrently transmitted, from each of the plurality of communication networks, determining a communication network to be used by the terminal device on the receiving side based upon call control condition information representing a condition relating to the call control and communication resource information included in a single call response received in an order, in each of the plurality of terminal devices, communicating with the exterior;

when the communicating receives the call control signals concurrently transmitted through the plurality of communication networks, respectively, estimated by the call controller to be available to the terminal device on the receiving side, returning a call response including the communication resource information together with the identifier through each of the plurality of communication networks to the call controller.

* * * * *